United States Patent [19]

Kim

[11] Patent Number: 5,606,542
[45] Date of Patent: Feb. 25, 1997

[54] OPTICAL PICKUP USING THREE BEAM TRACKING METHOD

[75] Inventor: Seong-Min Kim, Incheon, Rep. of Korea

[73] Assignee: Daewoo Electronics Co. Ltd., Seoul, Rep. of Korea

[21] Appl. No.: 429,147

[22] Filed: Apr. 26, 1995

[30] Foreign Application Priority Data

Apr. 30, 1994 [KR] Rep. of Korea ..................... 94-9416

[51] Int. Cl.[6] ........................................................ G11B 7/00
[52] U.S. Cl. ........................ 369/112; 369/119; 369/120; 369/44.37; 369/44.13; 250/201.5
[58] Field of Search ................................ 369/112, 116, 369/109, 119, 120, 121, 44.29, 44.37, 44.38, 44.13, 122; 250/201.5

[56] References Cited

U.S. PATENT DOCUMENTS

| | | | |
|---|---|---|---|
| 4,592,038 | 5/1986 | Kubota et al. | 369/121 |
| 5,090,004 | 2/1992 | Ohsato et al. | 369/44.37 |
| 5,138,592 | 8/1992 | Fujita | 369/44.13 |
| 5,235,584 | 8/1993 | Yoshio et al. | 369/44.29 |
| 5,303,216 | 4/1994 | Shinoda et al. | 369/13 |
| 5,337,299 | 8/1994 | Takahashi | 369/44.37 |
| 5,345,072 | 9/1994 | Hayashi et al. | 250/201.5 |
| 5,420,847 | 5/1995 | Maeda et al. | 369/120 |
| 5,479,387 | 12/1995 | Ando et al. | 369/44.37 |

*Primary Examiner*—Loha Ben
*Attorney, Agent, or Firm*—Fish & Richardson P.C.

[57] ABSTRACT

In an optical pickup using a three beam tracking method a laser light source generates laser beams of a main beam for reading out data from a data recording medium, a movable first guide beam and a movable second guide beam. These three pre-separated laser beams are incident upon the data recording medium and then reflected therefrom. The beam passes through a lens group to read out information recorded in the data recording medium. A light-receiving element receives a part of the reflected beam from the data recording medium for detecting tracking errors. According to this optical pickup having the laser light source generating three separated laser beams, when an azimuth angle in the three beam tracking method changes continuously, phases of the first and the second guide beam with respect to the track are maintained constantly, so that an amplitude of the tracking error signal can be maintained uniformly.

8 Claims, 4 Drawing Sheets

OPTICAL PICKUP USING THREE BEAM TRACKING METHOD

BACKGROUND OF THE INVENTION

1. Field of the Invention

The present invention relates to an optical pickup using a three beam tracking method. More particularly, the present invention relates to an optical pickup using a three beam tracking method wherein a light source emitting three separated laser beams is used.

2. Description of the Prior Arts

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a "track" hereinafter), and data are reproduced based on the beam reflected by the track. When the tracks are helically formed on the optical disk, since the sectors of a single track are not equidistant from the center of the rotation of the disk, tracking (radial) control is necessary in the read mode to accurately irradiate the track with a laser beam. Even if the tracks are concentrically formed, sectors of a single track are not equidistant from the center of the rotation of the disk due to the eccentricity in the disk, and therefore, tracking control is essential. This tracking control has been conventionally performed by a push-pull method (one beam method) using single laser beam or a three beam method (out-trigger method) wherein the single laser beam is separated into three beams. However, the three beam method is more often used because it is more stable for the tilting of disk or the defect of disk than the one beam method. One example of this three beam tracking method is disclosed in U.S. Pat. No. 5,128,914 (issued to Kurata et al.).

As a typical conventional example of a tracking circuit, a lens tracking circuit maybe mentioned wherein an objective lens is moved in response to a tracking error signal derived from the beam reflected by or transmitted through an optical disk, e.g., one beam or three beams formed from a beam irradiated from the laser by the one beam method or three beam method. The objective lens is normally supported and fixed by a spring on an optical head housing. A tracking actuator is energized to move the lens for the tracking control. When the tracking actuator is deenergized, the lens is held at a mechanically neutral point balanced by a spring force.

When the track eccentricity exceeds twenty or thirty microns, the objective lens deviates greatly from the mechanically neutral point, thereby combining an optical offset signal with the tracking error signal. The laser beam then traces a wrong track in response to the optical offset signal.

In order to eliminate the optical offset signal, a tracking system called a two-step servo system has been developed, as described in U.S. Pat. No. 4,761,773 (issued to Okada et al.). According to this system, the carriage and hence the optical pickup itself as well as the objective lens are moved to perform cooperative tracking.

Meanwhile, since the distance from the optical pickup to disk shifts minutely in the read mode in which the disk is rotated, it is difficult to correctly read data due to the shift, thus rendering focusing control essential. This focusing control has been conventionally performed by astigmatic method using astigmatism or a knife edge method.

As a typical conventional example of a focusing circuit, a lens focusing circuit may be mentioned wherein an objective lens is moved in response to a focusing error signal derived from laser beam which is irradiated from laser source and then reflected by or transmitted through an optical disk. The objective lens is normally the same lens that is used for the tracking control. A focusing actuator is energized to move the lens for the focusing control. When the focusing actuator is deenergized, the lens is held at a mechanically neutral point balanced by a spring force.

Figure 1:
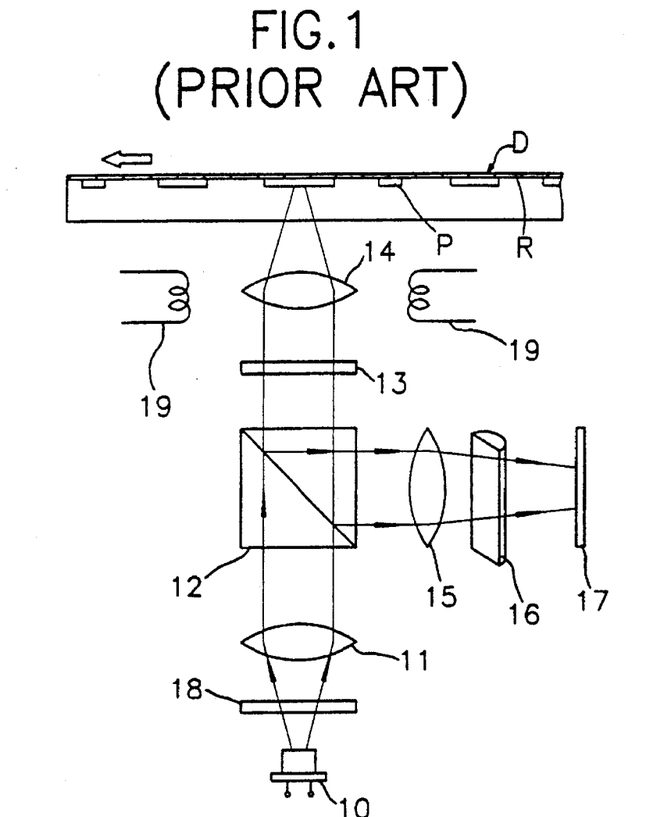
FIG. 1 is a schematic view for showing a conventional optical pickup of a three beam tracking method.

The conventional optical pickup of the three beam tracking method will be described in detail with reference to FIG. 1.

A light source 10 is provided with one laser diode to emit a laser beam. In the case of the three beam method, a grating 18 is provided at the front or the rear of a collimator lens 11, that is, between laser source 10 and collimator lens 11 or between collimator lens 11 and a beam splitter 12, which separates one beam into three beams. The laser beam irradiated from laser source 10 is changed into parallel beams by collimator lens 11. These parallel beams, in the three beam case, are separated into three beams by grating 18 and then pass through the beam splitter 12, a λ/4 plate 13, and an objective lens 14 to be incident upon the surface R of the disc D to form a beam spot of about 1 μm.

Beam splitter 12 has two right-angled prisms of which oblique (45°) facets meet with each other. A polarizing film is formed on the oblique facet so that while ensuring the straight property of the incident beam, a part of the incident beam transmits through the prisms, and the other part is reflected from the polarizing film at an angle of 90° together with an incident light. Additionally, λ/4 plate 13 serves to avoid interference of the incident beam and the reflective beam, and transforms a linear polarization into a circular polarization or inversely using double refraction phenomena.

The intensity of the light reflected from the disk D depends on existence of a pit thereof having recorded data. The recorded information is read out on the basis of the intensity of the reflected light. The reflected light is transformed into the parallel light while going through objective lens 14, polarized by 90° at λ/4 plate 13, and then is incident onto beam splitter 12. In beam splitter 12, one part of the incident beam is reflected at 90°. A converging lens 15 is placed at the optical path of the reflected light to converge the reflected light. The reflected light converged by converging lens 15 goes through cylindrical lens 16 (or knife edge) and then is received by a four or six partitioned light receiving element 17. The position errors of the pickup apparatus with respect to the disk D including a focusing error and a tracking error are detected from the image of the beam received on light receiving element 17, and focusing error signals and tracking error signals are generated according to these errors. A voice coil motor 19 as the objective lens actuator is actuated to move the objective lens in response to the error signals, so that focusing and tracking can be controlled. The information on the disk is reproduced on the basis of the intensity of the reflected light which is determined by pit P on the disc D.

Figure 2A:
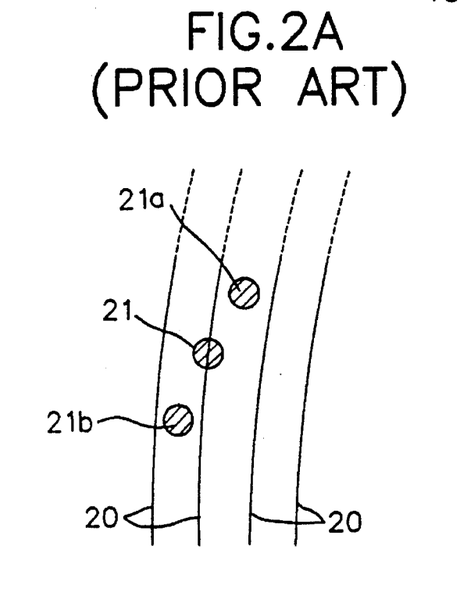
FIG. 2A is a schematic view for showing a shape of laser beam spot irradiated on a data recording medium of the optical pickup of FIG. 1.
Figure 2B:
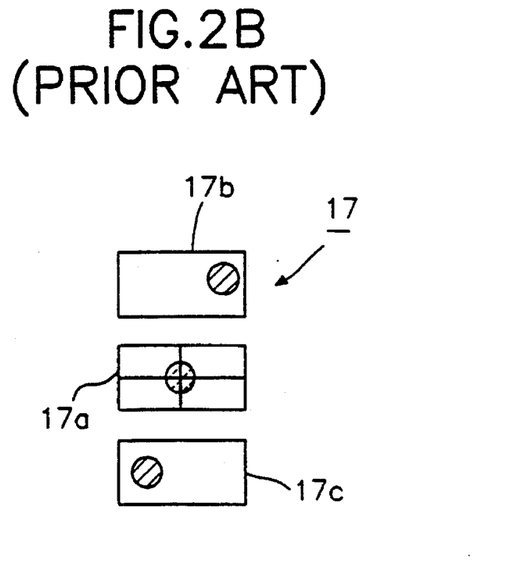
FIG. 2B is a schematic view for showing a shape of laser beam spot received by a receiving element after being reflected from the data recording medium.

According to the conventional optical pickup of the three beam tracking method, when the laser beam is irradiated from laser light source 10 having one laser diode, the one laser beam is split into three beams of a main beam 21, a first guide beam 21a and a second guide beam (21b) by grating 18. As shown in FIG. 2A, main beam 21 of three beams is irradiated to form a beam spot on disk D along the central part of the track. First and second guide beams 21a and 21b are irradiated on the upper and lower positions with respect to the position on which main beam 21 is irradiated, and on slightly deviated positions from the track center while being spotted on the track. As shown in FIG. 2B, the beams reflected from disk D are received by a main beam receiving part 17a and first and second guide beam receiving parts 17b and 17c of receiving element 17, respectively.

In order to improve the sensitivity with respect to the tracking error, it is necessary that grating 18 for separating one laser beam into three beams should be controlled so that the interval of the beam spots of the separated laser beams on the disk surface may be about ¼ track pitch wherein the track pitch means a pitch between one track and an adjacent track on the disk.

However, according to the conventional optical pickup in which three beams are formed by the grating to perform the tracking as described above, in order that the phase difference of two guide beams is 180°, that is, two guide beams are positioned at the position of ±¼ track pitch with respect to the main beam, controlling grating 18 with a high degree of precision is necessary. Furthermore, in order that at a tracking servo off mode the two guide beams are continuously maintained at the position of ±¼ track pitch and thus the intensity of the tracking error signal is maintained to the maximum value, controlling grating 18 with a high degree of precision is necessary. When the azimuth angle is changed in the case of the pickup of a swing arm type, an angle between track line 20 and a line formed by first and second guide beams 21a and 21b changes continuously, and thereby an amplitude of the tracking error signal changes continuously, too. As a result, it is difficult to provide satisfactory tracking control.

SUMMARY OF THE INVENTION

The present invention is intended to overcome the above-mentioned and numerous other disadvantages and deficiencies of the prior art. Therefore, it is an object of the present invention to provide an optical pickup using a three beam tracking method having a light source emitting three separated laser beams which makes it possible to maintain constantly an amplitude of tracking error signal by fixedly positioning guide beams with respect to a track line when the azimuth angle is changed continuously as in the case of the three beam tracking method.

To achieve the above object of the present invention, there is provided an optical pickup using a three beam tracking method which comprises:

a light source for emitting laser beams having a main beam for reproducing data from a data recording medium, a first movable guide beam and a second movable guide beam;

a lens group for determining optical paths of incident beams which are incident on the data recording medium and reflected beams which are reflected from the data recording medium so as to read out data recorded on the data recording medium beam by using the laser beams emitted from said light source, said lens group including an objective lens; and a light-receiving means to receive a part of the reflected beams for detecting a tracking error.

Preferably, the light source includes a first laser emitting element for generating the main beam; a plurality of second laser emitting elements among which a laser emitting element located at an appropriate position is selectively energized for controlling a position of the first guide beam which tracks the data recording medium; and a plurality of third laser emitting elements among which a laser emitting element located at an appropriate position is selectively energized for controlling a position of the second guide beam which tracks the data recording medium, and the light source further includes a laser emitting source energizing means for selectively energizing one of the second laser emitting elements and one of the third laser emitting elements.

The second laser emitting elements can be disposed in a circular arc shape centering around the first laser emitting element, and the third laser emitting elements can be disposed symmetrically with the second laser emitting elements in a circular arc shape centering around the first laser emitting element.

Laser emitting elements located in positions which generate respectively the first and the second guide beams of phases of ±90° with respect to the main beam are selectively energized among the second and third laser emitting elements.

In addition, the receiving element has a first light-receiving part for receiving the main beam of the three separated beams and second and third light-receiving parts which are arranged symmetrically with each other for receiving beams irradiated from the second and third plural laser emitting elements.

According to this optical pickup of the three beam tracking method, even in a tracking servo off mode in case of the three beam tracking method or even when an azimuth angle is changed continuously as in tracking with a swing-arm type pickup, since the first and second guide beams are always irradiated in phases of ±90° with respect to the main beam, an amplitude of tracking error signal for a tracking error generated in disk-tracking is maintained at a maximum value. As a result, the tracking errors are easily detected.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENT

Hereinafter, the preferred embodiment of this invention will be described in detail with reference to the accompanying drawings.

Figure 3:
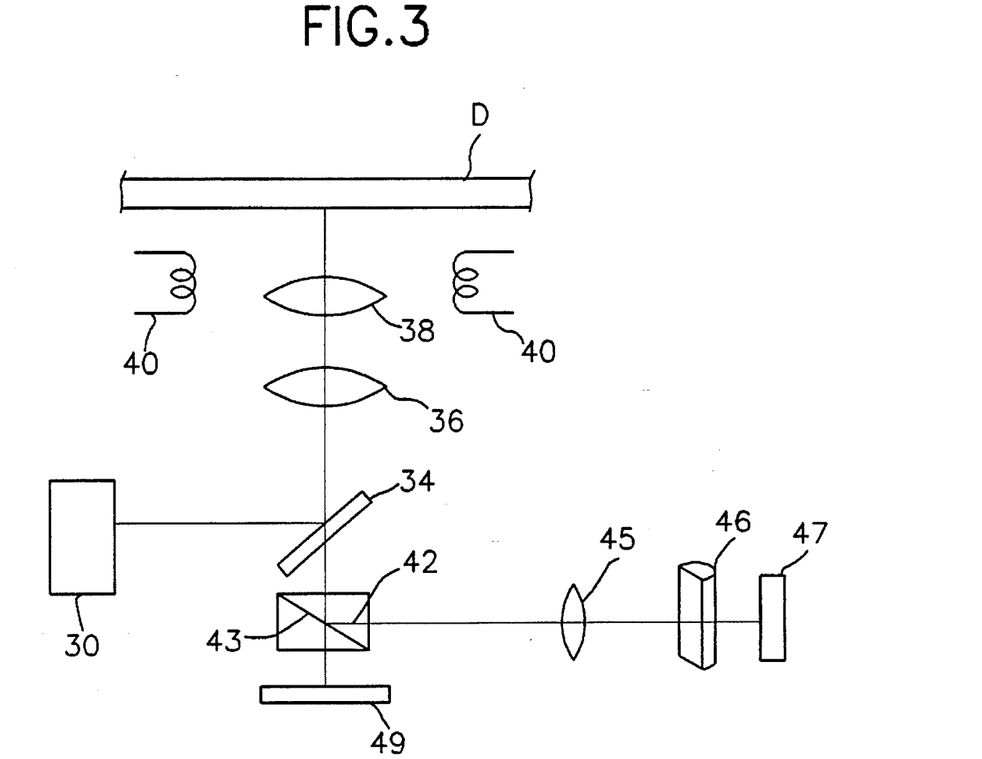
FIG. 3 is a schematic view for showing an optical pickup of the three beam tracking method according to one embodiment of the present invention.
Figure 4:
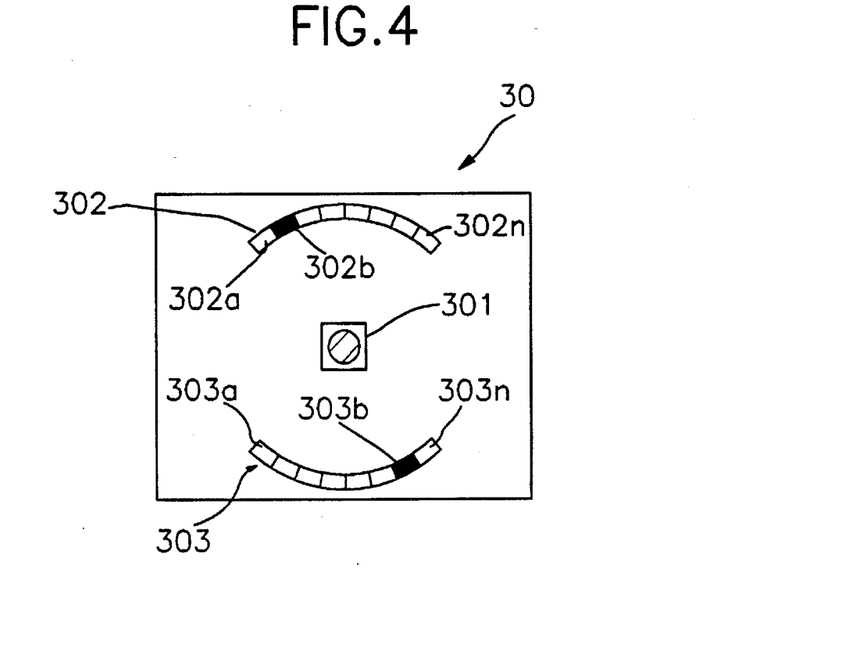
FIG. 4 is a schematic view for showing one embodiment of a laser source for emitting laser beams formed of three beams, i.e., a main beam, a first guide beam and a second guide beam in the optical pickup of FIG. 3.
Figure 5A:
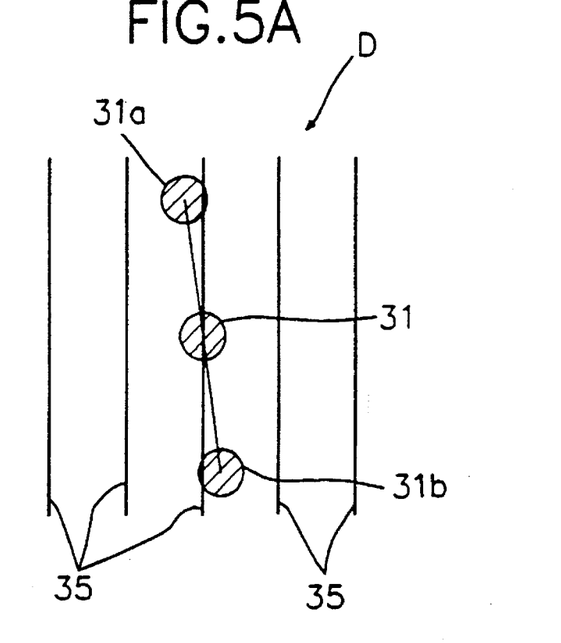
FIG. 5A is a schematic view for showing the shape of laser beam spot irradiated on the data recording medium from the laser source of FIG. 4.
Figure 6:
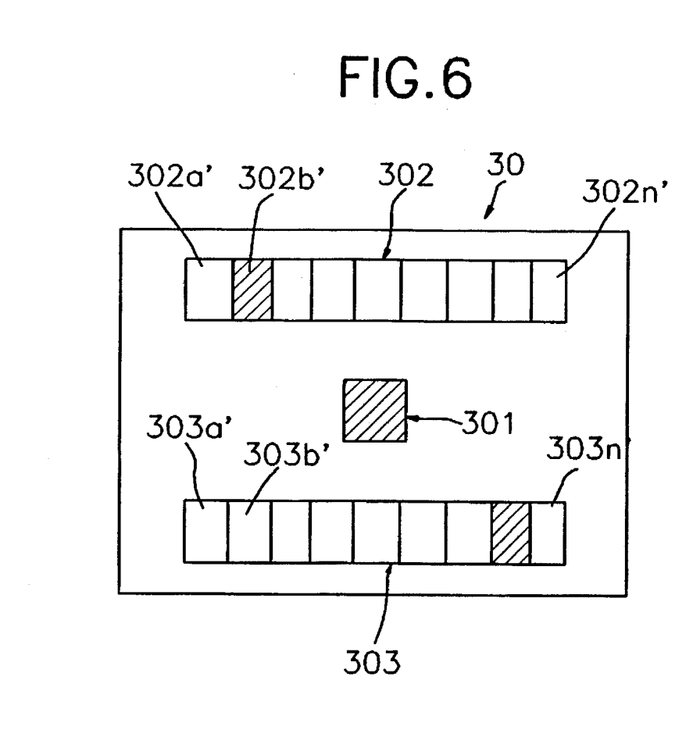
FIG. 6 is a schematic view for showing another embodiment of a laser source for emitting laser beams formed of three beams, i.e., a main beam, a first guide beam and a second guide beam in the optical pickup of FIG. 3.

FIG. 3 is a schematic view for showing the optical pickup of the three beam tracking method according to one embodiment of the present invention. FIG. 4 is a schematic view for showing one embodiment of a laser source for emitting laser beams formed of three beams, i.e., a main beam, a first guide beam and a second guide beam in the optical pickup of FIG. 3. In the figures, D denotes a data recording medium, e.g., disk, which is irradiated with laser beam. Reference numeral 30 denotes a source of laser beam which is provided with a first laser emitting element 301, second plural laser emitting elements 302a, 302b, . . . 302n, and third plural laser emitting elements 303a, 303b, . . . 303n for generating separate laser beams comprised of a main beam 31 for reading out data from the data recording medium, a movable first guide beam 31a beam and a second guide beam 31b, respectively, as shown in FIG. 5A. The second plural laser emitting elements 302a, 302b, . . . 302n are disposed in a circular arc shape centering around first laser emitting element 301. In the tracking of the data recording medium, the phase of the first guide beam which is incident on the data recording medium can be adjusted by selectively energizing a laser emitting element placed at an appropriate position of the second plural laser emitting elements 302a, 302b, . . . 302n. The third plural laser emitting elements 303a, 303b, . . . 303n are disposed in a circular arc shape centering around the first laser emitting element 301 and are symmetrical with the second plural laser emitting elements 320a, 302b, . . . 302n. The second plural laser emitting elements 320a, 302b, . . . 302n and the third plural laser emitting elements 303a, 303b, . . . 303n need not be disposed in the circular arc shapes, but may be disposed in straight lines, e.g., as shown in FIG. 6, second prime plural laser emitting elements 302a', 302b', . . . 302n' and third prime plural laser emitting elements 303a', 303b', . . . 303n' may be disposed in straight lines which are symmetric with each other centering first laser emitting element 301.

In the tracking of the data recording medium, a phase of the second guide beam which is incident on the data recording medium can be adjusted by selectively energizing a laser emitting element placed at an appropriate position among the third plural laser emitting elements 303a, 303b, . . . 303n. Preferably, a phase difference between the second guide beam and the first guide beam on the data recording medium D is 180° by selectively energizing a laser emitting element placed at the position which is symmetrically centering around the first laser emitting element 301 corresponding to the energized second laser emitting element among the third plural laser emitting elements 303a, 303b, . . . 303n.

In order to irradiate the separated three laser beams from light source 30 onto the data recording medium and to read out data from the data recording medium, a lens group is provided which has first and second beam splitters 34 and 42, a collimator lens 36, an objective lens 38, etc., for determining optical paths of incident beams on the data recording medium and reflected beams from the data recording medium. First beam splitter 34 is placed such that the laser beam is irradiated toward disk D. The laser beam which has been bent through 90° by first beam splitter 34 is changed into the parallel beam by collimator lens 36. The laser beam which has passed through collimator lens 36 passes through objective lens 38 to be focused with a beam spot of about 1 μm on the surface of disk D. Reference numeral 40 denotes a voice coil motor as an objective lens actuator which controls the focusing on the surface of disk D by changing an axial displacement of objective lens 28. The incident laser beam is reflected from disk D, and the reflected laser beam is transmitted in the order of objective lens 38, collimator lens 36 and first beam splitter 34, and then is incident on second beam splitter 42. This beam incident onto second beam splitter 42 is split by polarizing film 43 formed on its 45° oblique facet. Second beam splitter 42 is formed of two right-angled prisms of which oblique (45°) facets meet with each other. A polarizing film is formed on the oblique facet so that while ensuring the straight traveling property of the incident beam, a part of the incident beam can be transmitted through the prisms and the other part of the incident beam be reflected from the polarizing film at an angle of 90° with respect to the incident beam.

The intensity of the light reflected from disk D depends on the existence of a pit thereof, and the information can be read out on the basis of the intensity of the reflected light.

A part of the laser beam is reflected to be bent through 90° by second beam splitter 42. A converging lens 45 is positioned on the optical path of the reflected light to converge the reflected light. The reflected light converged by converging lens 45 passes through a cylindrical lens 46 (or a knife edge) to be received by a four or six partitioned light receiving element 47 (comprised of a light-receiving diode). Furthermore, the other part of the laser beam goes straight through second beam splitter 42. A four or six partitioned light receiving element 49 is disposed on the optical path of this straight beam. Positional errors of the pickup with respect to the disk, e.g., focusing and tracking errors, are detected on the basis of beam images received by light receiving elements 47 and 49, to generate focusing and tracking error signals. In response to these signals, voice coil motor 40 is actuated so that objective lens 30 may be moved in an axial direction or in a radial direction. As a result, the focusing and the tracking can be controlled.

Figure 5B:
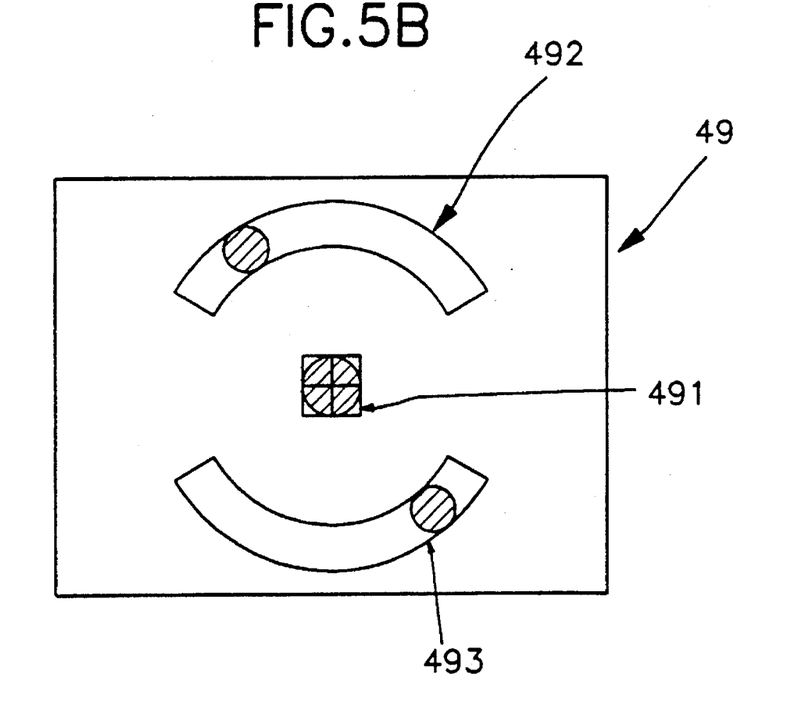
FIG. 5B is a schematic view for showing a shape of laser beam spot received by a receiving element after being reflected from the data recording medium of FIG. 5A.
Figure 7:
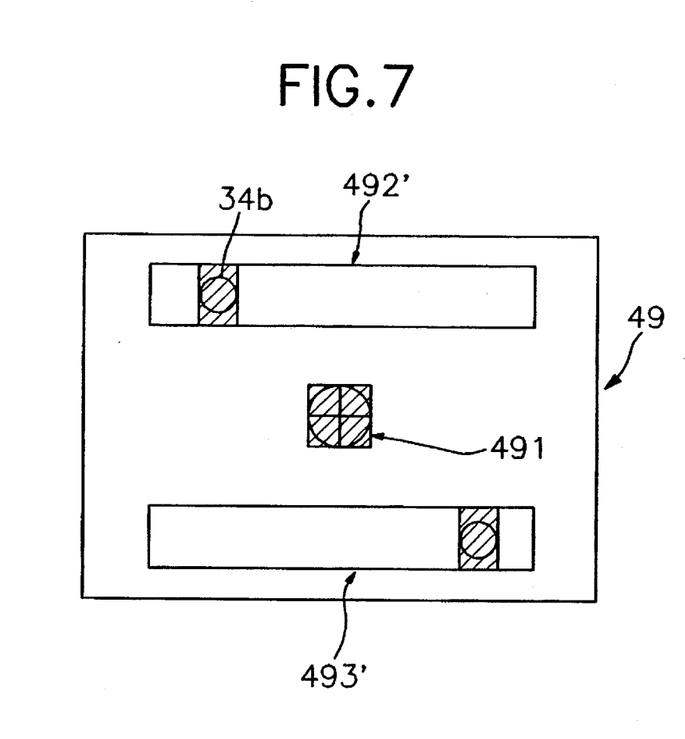
FIG. 7 is a schematic view for showing the shape of the beam spot received by a receiving element after the laser beam irradiated from the laser source of FIG. 6 is incident on and then reflected from the date recording medium.

Light receiving element 49 has a first receiving part 491 for receiving the main beam of the three separated beams, a second receiving part 492 for receiving the first guide beam and a third receiving part 493 for receiving the second guide beam. Preferably, when the first and the second guide beams are selectively generated from the second and the third plural laser emitting elements 302 and 303 which are disposed in circular arc shapes facing each other centering around first laser emitting element 301 as shown in FIG. 4, the second and the third light-receiving parts 492 and 493 are, as shown in FIG. 5B, disposed in circular arc shape facing each other centering around first light-receiving part 491 so that they can receive all the first and the second guide beams generated from all these second and third plural laser emitting elements. First light-receiving part 491 is formed of four partitioned light receiving elements. According to another embodiment, as shown in FIG. 6, when the first and the second guide beams are selectively generated from the second prime and the third prime plural laser emitting sources 302' and 303' which are disposed in straight lines with respect to first laser emitting source 301, the second prime and the third prime receiving parts 492' and 493' are, as shown in FIG. 7, disposed in straight lines facing each other with respect to first receiving part 491, so that they can receive all the first and the second guide beams generated from all these second prime and third prime plural laser emitting elements.

Hereinafter, an operation of the optical pickup of the present invention will be described.

In order to read out data recorded on data recording medium D by means of the pickup, for example, the swing arm type pickup, light source 30 which is formed of first laser emitting element 301, second plural laser emitting elements 302a, 302b, . . . 302n and third plural laser emitting elements 303a, 303b, . . . 303n generates the laser beams comprised of the main beam and the first and second guide beams. The first guide beam is generated by selectively energizing one laser emitting element placed at a desired location among second plural laser emitting elements 302a, 302b, . . . 302n. Namely, considering the phase of the first guide beam with respect to the main beam upon the data recording medium D, an appropriate laser emitting element is energized. Also, the second guide beam is generated by energizing the laser emitting element placed at the opposite location centering around first laser emitting element 301 corresponding to the energized second laser emitting element among third plural laser emitting elements 303a, 303b, . . . 303n. Preferably, a phase difference between the second guide beam and the first guide beam upon data recording medium D is 180° so that an amplitude of the tracking error signal can be maximized and maintained constantly.

These three separated laser beams are incident upon first beam splitter 34 to be bent through 90° by first beam splitter 34. The bent laser beams are changed into parallel beams through collimator lens 36 and then are transmitted through objective lens 38 to form three beam spots of about 1 μm on the surface of disk D.

However, since the tracking on data recording medium D is performed by means of the pickup of the swing arm type, the phase differences between beam spots irradiated on data recording medium D continuously change according to the displacement of the tracking position of the pickup. In order to compensate the successive changes of the phase differences between the beam spots on data recording medium D, an appropriate laser emitting element of the second plural laser emitting elements 302a, 302b, . . . 302n is selectively energized, for example, by means of a microprocessor so that the phase of the first guide beam can be maintained at 90° with respect to the main beam. Also, an appropriate laser emitting element of third plural laser emitting elements 303a, 303b, . . . 303n (corresponding to the laser emitting element of second plural laser emitting elements which emits a laser beam) is selectively energized so that the phase of the second guide beam can be maintained at 180° with respect to the first guide beam, and thus at −90° with respect to the first guide beam on recording medium. Preferably, this selection of laser emitting element is performed by the predetermined program of the microprocessor which determines the variable phase between three beams and the track according to a tracking radius of disk D and selects the laser emitting element capable of compensating phases of the first and the second guide beams in order to be symmetrical and be at ±90° with respect to the main beam.

Therefore, as shown in FIG. 5A, the first and the second guide beams are irradiated on disk D with phases of ±90° with respect to the main beam, so that the amplitude of the tracking error signal on the track line 35 of disk D may be maximized and the tracking error is very easily detected.

The incident beam on data recording medium, e.g., disk D, is reflected therefrom and then the reflected beam passes through in the order of objective lens 38, collimator lens 36 and first beam splitter 34. Then, the reflected beam is split through second beam splitter 42. Due to the polarizing film of second beam splitter 42, a part of the beam incident on second beam splitter 42 is transmitted therethrough and the other part of the incident beam is reflected therefrom at an angle of 90° with respect to the incident beam.

The intensity of the light reflected from the disk D depends on the existence of a pit thereof having recorded data. The information on the disk is reproduced on the basis of the intensity of the reflected light which is determined by pit P on the disc D.

In second beam splitter 42, a part of the reflected laser beam (by pit of the disk) is reflected to be bent through an angle of 90°. A converging lens 45 is positioned on the optical path of the reflected light to converge the reflected light. The reflected light converged by converging lens 45 passes through a cylindrical lens 46 (or a knife edge) to be received by the four or six partitioned light receiving element 47. Meanwhile, the other part of the reflected laser beam passes through second beam splitter 42 to travel straight. Four or six partitioned light receiving element 49 is disposed on the optical path of the straight beam. On the basis of the beam image received by light receiving elements 47 and 49, positional errors of the pickup with respect to the disk, e.g., a focusing error or a tracking error, are detected to generate the focusing and tracking error signals. Responsive to these signals, voice coil motor 40 is actuated so that objective lens 38 can be moved in the axial or in the radial direction, and therefore the focusing or the tracking can be controlled.

First light-receiving part 491 of light receiving element 49 is a four partitioned light-receiving part, and obtains the RF signal by receiving the main beam of three separated beams. Second light-receiving part 492 of receiving diode 49 receives the first guide beam and third light-receiving part 493 receives the second guide beam. Preferably, as shown in FIGS. 4 and 5B, when the first and the second guide beams are selectively generated from second and third plural laser emitting elements 302 and 303 which are disposed in the circular arc shapes facing each other centering around first laser emitting element 491, and also second and third light-receiving parts 492 and 493 are disposed in the circular arc shapes facing each other centering around first light-receiving part 491, they can receive all the first and the second guide beams generated from all these second and third plural laser emitting elements. As shown in FIGS. 6 and 7, when the first and the second guide beams are generated selectively form the second prime and the third prime plural laser emitting sources 302' and 303' which are disposed in straight lines with respect to the first laser emitting source 301, and also the second prime and the third prime receiving parts 492' and 493' are disposed in straight lines facing each other with respect to first receiving part 491, they can receive all the first and the second guide beams generated from all these second prime and third prime plural laser emitting elements.

According to the optical pickup of the three beam tracking method of the present invention, when a phase of the tracking beam is continuously changed with respect to the track, for example, as in the tracking servo off mode or as in the tracking of the disk by the swing arm type pickup, the first and the second guide beams can be generated in the compensated positions from which the guide beams come to have phase angles of ±90° with respect to the main beam on the disk, so that an amplitude of tracking error signal on the disk track can be maximized and is always maintained constantly to easily detect the tracking error. Furthermore, since the pickup of the present invention has the laser source which generates the three separated beams by itself, the tracking by three beams can be performed without the grating for obtaining three separated laser beams, so that the structure of the optical pickup may be simplified.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of patentable novelty that reside in the present invention, including all features that would be treated as equivalents thereof by those skilled in the art to which this invention pertains.

What is claimed is:

1. An optical pickup using a three beam tracking method, the optical pickup comprising:

a light source for emitting laser beams having a main beam for reproducing data from a data recording medium, a first movable guide beam and a second movable guide beam, wherein the light source comprises a first laser emitting element for generating the main beam; a plurality of second laser emitting elements among which a laser emitting element located at an appropriate position is selectively energized for controlling a position of the first guide beam which tracks the data recording medium; and a plurality of third laser emitting elements among which a laser emitting element located at an appropriate position is selectively energized for controlling a position of the second guide beam which tracks the data recording medium, and the light source further includes a laser emitting source energizing means for selectively energizing one of the second laser emitting elements and one of the third laser emitting elements;

a lens group for determining optical paths of incident beams which are incident on the data recording medium and reflected beams which are reflected from the data recording medium so as to read out data recorded on the data recording medium by using the laser beams emitted from the light source, the lens group including an objective lens; and a light-receiving means to receive a part of the reflected beams for detecting a tracking error.

2. The optical pickup as claimed in claim 1, wherein the second laser emitting elements are disposed in a circular arc shape centering around the first laser emitting element, and the third laser emitting elements are disposed symmetrically with the second laser emitting elements in a circular arc shape centering around the first laser emitting element.

3. The optical pickup as claimed in claim 1, wherein the second laser emitting elements are disposed in a straight line with respect to the first laser emitting element, and the third laser emitting elements are disposed symmetrically with the second laser emitting elements in a straight line with respect to the first laser emitting element.

4. The optical pickup as claimed in claim 1, wherein, laser emitting elements located in positions which generate respectively the first and the second guide beams of phases of ±90° with respect to the main beam are selectively energized among the second and third laser emitting elements.

5. The optical pickup as claimed in claim 1, wherein the laser emitting element energizing means comprises a microprocessor.

6. The optical pickup as claimed in claim 1, wherein the light-receiving means has a first light-receiving part for receiving the main beam of the three beams, a second light-receiving part for receiving the first guide beam and a third light-receiving part for receiving the second guide beam.

7. An optical pickup using a three beam tracking method, comprising:

a light source for emitting laser beams separated into three beams includes a first laser emitting element for generating a main beam, a plurality of second laser emitting elements disposed in a circular arc shape centering around the first laser emitting element, among the second laser emitting elements being selectively energized a laser emitting element located at an appropriate position for controlling a position of a first guide beam which tracks a data recording medium, and a plurality of third laser emitting elements disposed symmetrically to the second laser emitting elements in a circular arc shape centering around the first laser emitting element, among the third laser emitting elements being selectively energized a laser emitting element located at an appropriate position for controlling a position of a second guide beam which tracks the data recording medium;

a laser emitting source energizing means for selectively energizing the second and third laser emitting elements;

a lens group for determining optical paths of incident beams which are incident on the data recording medium and reflected beams which are reflected from the data recording medium and for reading out data recorded on the data recording medium by the laser beams emitted from said light source, said lens group including an objective lens; and a light-receiving means for receiving a part of the reflected beam from the data recording medium to detect a tracking error, which has a first light-receiving part for receiving the main beam of the three separated beams, a second light-receiving part formed in a circular arc shape centering around the first light-receiving part for receiving the first guide beam, and a third light-receiving part formed symmetrically to the second light-receiving part in a circular arc shape centering around the first light-receiving part for receiving the second guide beam.

8. An optical pickup using a three beam tracking method, comprising:

a light source for emitting laser beams separated into three beams includes a first laser emitting element for generating a main beam, a plurality of second laser emitting elements disposed in a straight line centering around the first laser emitting element, among the second laser emitting elements being selectively energized a laser emitting element located at an appropriate position for controlling a position of a first guide beam which tracks a data recording medium, and a plurality of third laser emitting elements disposed symmetrically to the second laser emitting elements in a straight line centering around the first laser emitting element, among the third laser emitting elements being selectively energized a laser emitting element located at an appropriate position for controlling a position of a second guide beam which tracks the data recording medium;

a laser emitting source energizing means for selectively energizing the second and third laser emitting elements;

a lens group for determining optical paths of incident beams which are incident on the data recording medium and reflected beams which are reflected from the data recording medium and for reading out data recorded on the data recording medium by the laser beams emitted from said light source, said lens group including an objective lens; and a light-receiving means for receiving a part of the reflected beam from the data recording medium to detect a tracking error, which has a first light-receiving part for receiving the main beam of the three separated beams, a second light-receiving part formed in a straight line centering around the first light-receiving part for receiving the first guide beam, and a third light-receiving part formed symmetrically to the second light-receiving part in a straight line centering around the first light-receiving part for receiving the second guide beam.

* * * * *